(12) United States Patent
Selen et al.

(10) Patent No.: US 8,995,922 B2
(45) Date of Patent: Mar. 31, 2015

(54) METHOD AND APPARATUS RELATING TO SPECTRUM SENSING

(75) Inventors: Yngve Selen, Uppsala (SE); Jonas Kronander, Uppsala (SE); Hugo Tullberg, Nykoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1148 days.

(21) Appl. No.: 12/994,207

(22) PCT Filed: Jun. 3, 2009

(86) PCT No.: PCT/SE2009/050660
§ 371 (c)(1),
(2), (4) Date: Nov. 23, 2010

(87) PCT Pub. No.: WO2009/148399
PCT Pub. Date: Dec. 10, 2009

(65) Prior Publication Data
US 2011/0098005 A1    Apr. 28, 2011

Related U.S. Application Data

(60) Provisional application No. 61/058,668, filed on Jun. 4, 2008.

(51) Int. Cl.
*H04B 17/00* (2006.01)
*H04W 24/08* (2009.01)
(Continued)

(52) U.S. Cl.
CPC .............. *H04W 24/08* (2013.01); *H04W 4/08* (2013.01); *H04W 24/00* (2013.01); *H04W 88/02* (2013.01)
USPC ...................................... 455/67.11

(58) Field of Classification Search
CPC ....... H04W 24/08; H04W 24/06; H04B 17/00

USPC .......................... 455/67.11, 69, 454
See application file for complete search history.

(56) References Cited

U.S. PATENT DOCUMENTS 8,472,868 B2 * 6/2013 Mu et al. ............................ 455/7
8,498,580 B2 * 7/2013 Mourad ..................... 455/67.11
(Continued)

FOREIGN PATENT DOCUMENTS

CN            1917702 A      2/2007
EP          1 098 546 A2     5/2001

OTHER PUBLICATIONS

Office Action issued in corresponding Chinese application No. 200980120794.2 on Nov. 5, 2012, 6 pages.
(Continued)

*Primary Examiner* — Andrew Wendell
*Assistant Examiner* — Maryam Soltanzadeh
(74) *Attorney, Agent, or Firm* — Rothwell, Figg, Ernst & Manbeck, P.C.

(57) ABSTRACT

The invention presents methods and corresponding device relating to cooperative spectrum sensing. First a candidate set of sensors that can participate in an occasion of cooperative spectrum sensing is obtained. A cost formula for calculating a cost associated with using sensors from the candidate set in the cooperative spectrum sensing is then defined (75; 107, 97). The candidate set is partitioned (29; 14, 145) into an active set and a passive set. The active set contains any sensor (s) from the candidate that is to participate in the cooperative spectrum sensing. The passive set includes any sensor (s) that is not to participate in the cooperative spectrum sensing. The partitioning of the candidate set is done by applying an optimization procedure (79, 81, 83; 111, 113, 115) which performs a constrained optimization of the cost in accordance with the defined cost formula.

17 Claims, 7 Drawing Sheets

(51) Int. Cl.
*H04W 4/08* (2009.01)
*H04W 24/00* (2009.01)
*H04W 88/02* (2009.01)

(56) References Cited

U.S. PATENT DOCUMENTS

| | | | |
|---|---|---|---|
| 8,509,696 B2* | 8/2013 | Muraoka et al. | 455/62 |
| 8,582,481 B2* | 11/2013 | Kim et al. | 370/311 |
| 8,600,394 B2* | 12/2013 | Auer et al. | 455/447 |
| 8,744,749 B2* | 6/2014 | Gupta et al. | 701/408 |
| 8,849,217 B2* | 9/2014 | Rousu et al. | 455/69 |
| 2010/0105336 A1* | 4/2010 | Attar et al. | 455/67.11 |

OTHER PUBLICATIONS

Zhang, W. et al. "Cooperative Spectrum Sensing Optimization in Cognitive Radio Networks", Communications, 2008, ICC '08, IEEE International Conference, May 19-23, 2008, pp. 3411-3415.

Peh, E., et al., "Optimization for Cooperative Sensing in Cognitive Radio Networks", Wireless Communications and Networking Conference, 2007, WCNC 2007, IEEE, Mar. 11-15, 2007, pp. 27-32.

Ghasemi, A., et al., "Opportunistic Spectrum Access in Fading Channels Through Collaborative Sensing", Journal of Communications, vol. 2, No. 2, Mar. 2007, pp. 71-82.

Mishra, S.M., et al., "Cooperative Sensing Among Cognitive Radios", Communications 2006, ICC '06, IEEE International Conference, vol. 4, Jun. 2006, pp. 1658-1664.

Cabric D., et al., "Implementation Issues in Spectrum Sensing for Cognitive Radios", Signals, Systems and Computers, 2004, Conference Record of the Thirty-Eighth Asilomar Conference, vol. 1, Nov. 7-10, 2004, pp. 772-776.

Cabric D., et al., "Spectrum Sensing Measurements of Pilot, Energy, and Collaborative Detection", Military Communications Conference, 2006, MILCOM 2006, IEEE, Section IV, Oct. 23-25, 2006, pp. 1-7.

Selen, Y., et al., "Sensor Selection for Cooperative Spectrum Sensing", New Frontiers in Dynamic Spectrum Access Networks, 2008, DYSPAN 2008, 3rd IEEE Symposium, Oct. 14-17, 2008, pp. 1-11.

* cited by examiner

METHOD AND APPARATUS RELATING TO SPECTRUM SENSING

CROSS-REFERENCE TO RELATED APPLICATIONS

This application is a 35 U.S.C. §371 National Phase Entry Application from PCT/SE2009/050660, filed Jun. 3, 2009, and designating the United States, and claims priority to provisional application Ser. No. 61/058,668, filed Jun. 4, 2008, the contents of which are incorporated herein by reference.

TECHNICAL FIELD

The present invention pertains to the field of radio communications, and in particular to the part of this field where spectrum utilisation is based on cooperative spectrum sensing.

BACKGROUND

Recent research has shown that usage of the radio spectrum is often fairly inefficient. One key factor in this is the current spectrum licensing system. That is, some part of the radio spectrum is licensed to a party, such as an operator of a radio communications system, who is given an exclusive right to use this part of the radio spectrum. For example, even though significant parts of the useful spectrum is licensed, several measurements (see, e.g. T. Erpek, K. Steadman, D. Jones, "Spectrum Occupancy Measurements: Dublin, Ireland, Collected On Apr. 16-18, 2007", Shared Spectrum Company Report, 2007) indicate that some parts of this spectrum are highly underutilized. Therefore, a more flexible use of the radio spectrum has become a research intensive subject within which the aim is at optimizing, i.e. maximizing, the usage of the available radio spectrum. One approach pursued in regulations has been to license spectrum to a licensee (primary user), while at the same time allowing the licensed frequency band to be used by other users (secondary users) under the condition that they do not introduce harmful interference to the system operation of the primary user. Another approach under discussion is to have completely unlicensed spectrum, which has to be shared with equal right among many users.

New notions and terminologies have been developed in the effort to introduce a more flexible and efficient use of the radio spectrum.

One new term is Dynamic Spectrum Access, which describes spectrum access where radio units are not limited to using only a specific spectrum band (such as their licensed spectrum), but rather adapt the spectrum they use depending on conditions such as estimated throughput and latency requirements, spectrum availability etc. For instance, a cellular system suffering from high load in its own licensed spectrum could dynamically access spectral bands owned by some other licensee to temporarily increase its throughput, as long as it does not cause unacceptable interference to the primary system, or a network of communicating nodes may change its operating frequency depending on current spectral conditions. Potentially, dynamic spectrum access can enable more efficient use of the limited resource that radio spectrum is. This is because several systems then share the same resources such that when one system requires only a small amount of spectrum, other systems experiencing higher loads can utilize a greater bandwidth.

Another important notion is spectrum-on-demand, which means that radio nodes only operate as unlicensed (or secondary) users in a spectral band when triggered to do so. One reason for the radio nodes to initiate communication over unlicensed frequency bands could be that a licensed frequency band (if any) can not fulfill desired needs. Such events may occur, e.g., during peak hours at central stations, during special events such as concerts or sport events, or when several users in the same cell each demand a high bandwidth.

The spectrum-on-demand scenario usually looks slightly different depending upon the structure of the network, which may be both centralized and decentralized (autonomous).

A centralized network has a main (or central) node which has a controlling function over the network. Examples of centralized networks are the common cellular networks employed today for mobile communication, in which the main node (typically a base station (BS)) handles all communication with other nodes (user equipments UEs)) within a cell. Another example of a centralized network is an ad hoc network in which a master node (a function which may be given and handed over to any node in the network) has a regulating function over the other nodes.

In a decentralized network, all nodes are essentially equal (i.e. no node can control the operation of another node) and operate and communicate autonomously. Spectrum use is performed according to predetermined rules, or etiquette. If a node experiences an increased bandwidth demand, it can increase its use of a shared spectrum, if neighbouring nodes accept this, e.g., if they are willing to reduce their spectrum use. Alternatively the node can try to detect and access spectrum unused by the system (which does not necessarily have to be shared with the other nodes) to meet the demand.

A concept, which relates to both centralized and decentralized networks (as well as to Dynamic Spectrum Access in general), is so-called spectrum sensing (sensing hereinafter). Sensing is the act of determining, by monitoring radio transmissions, whether e.g. a particular spectrum band is currently at least in part free for use. That is, sensing is a way of finding spectrum opportunities, which may be accessed in a dynamic, and possibly secondary, manner. A device which takes part in the sensing is usually referred to as a sensor. Various network nodes, such as user equipments and base stations, may act as sensors. Since spectrum opportunities which are identified by sensing can be viewed as less reliable than spectrum specifically licensed for the system, these opportunities may, e.g., be used for transmissions that are considered to be non time-critical.

It has been shown, e.g. in A. Ghasemi, E. S. Sousa, "Opportunistic Spectrum Access in Fading Channels Through Collaborative Sensing," Journal of Communications, vol. 2, no. 2, pp. 71-82, March 2007, that several sensors which experience, at least to some extent, uncorrelated fading (with respect to the possible signals to which the sensing is applied) are required for high reliability of the sensing result. This is because a single sensor may be in a deep fade, which makes it virtually impossible, or at least very difficult, to detect a current usage of spectrum resources. Therefore, it is often advocated that sensing should be performed in a cooperative manner involving a plurality of sensors.

Current research has been mainly focused on providing methods for detecting spectrum opportunities using cooperative sensing. Very little, however, has been done on how to select the sensors that will participate in the cooperative sensing. The concept of "distance spread" is treated in S. M. Mishra, A. Sahai, R. W. Brodersen, "Cooperative Sensing among Cognitive Radios", IEEE Intl. Conf. on Communication, Vol. 4, June 2006 pp. 1658-1663. There, sensing performance with respect to the number of sensors involved in cooperative sensing and the distance between the farthest sensors on a straight line is treated. The article shows that once a certain number of sensors are participating in the cooperative sensing, adding more sensors only improves the sensing performance marginally. A drawback with the study, however, is that the geometry is mainly limited to a straight line.

A sensor performing spectrum sensing will deplete overall system resources. For example, the sensor will use power for its receiver and baseband circuitry and may thus reduce a battery life-time, and the sensing process will consume processing capacity. Also, a sensor normally needs to report its sensing result somehow, which requires additional communication resources. It is therefore desirable to use few sensors in the sensing, while still having a sufficient number such that the sensing is reliable. In this sense, the number of sensors to use is a trade-off between having a high reliability of the sensing result, and having a low or reasonable demand on resources, such as battery capacity of the partaking sensors, and transmission overhead in the communication system. Consequently, there exists a need to be able to select the sensors that participate in the cooperate sensing in an "optimal" manner which suitably balances these conflicting aspects.

One object of the present invention is therefore to overcome or at least mitigate at least one of the above-indicated difficulties.

SUMMARY

According to one aspect of the present invention, the above-stated object is achieved with a method according to the following. First a candidate set of sensors that that are available to participate in an occasion of cooperative spectrum sensing is obtained. A cost formula for calculating a cost associated with using sensors from the candidate set in the cooperative spectrum sensing is then defined. The candidate set is partitioned into an active set and a passive set. The active set contains any sensor(s) from the candidate that is to participate in the cooperative spectrum sensing. The passive set includes any sensor(s) that is not to participate in the cooperative spectrum sensing. The partitioning of the candidate set is done by applying an optimization procedure which performs a constrained optimization of the cost in accordance with the defined cost formula.

According to another aspect of the present invention, the above-stated object is achieved with a method according to the following. As above, a candidate set of sensors is first obtained. Estimates of positions of the sensors in the candidate set are also obtained. A first sensor is selected from the candidate set, and the first sensor is then added to an active set. A next sensor is then selected from the active set. The selected next sensor is here a sensor that has not previously been selected form the candidate set. The selected next sensor is then added either to the active set or to a passive set. What determines whether the selected next sensor is added to the active set or the passives set is its distance to the sensor(s) already in the active set. If a distance from the selected next sensor to each sensor already in the active set is greater than a threshold value, then the selected next sensor is added to he active set. Otherwise, the next sensor is added to the passive set. The threshold value is here a value greater than or equal to a predetermined decorrelation distance. This procedure may now be continued as described until the active set has reached a predetermined target level or until all sensors in the candidate set have been added to either the active set or the passive set.

According to yet another aspect of the present invention, the above-stated object is achieved with elements for sensor selection configured to perform the above-indicated methods.

One advantage with embodiments of the present invention is that efficient and systematic approaches to sensor selection for cooperative spectrum are provided. By not necessarily involving every candidate sensor in cooperate spectrum sensing, a strain on system resources introduced by cooperate spectrum sensing can be kept at an acceptably low level. Furthermore, the systematic partitioning of the candidate set suggested above, assures that cooperate sensing still becomes fairly reliable. Simulations have shown that embodiments of the present inventions outperform, for example, random selection of sensors to be used in cooperative spectrum sensing. This involves, for example, improved probability of primary user detection as well as reduced probability of false alarm.

The invention will now be described further using exemplary embodiments and referring to the drawings. A person skilled in the art will appreciate that further objects and advantages may be associated with these exemplary embodiments of the invention.

Modifications and other embodiments of the disclosed invention will come to mind to one skilled in the art having the benefit of the teachings presented in the following descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

DETAILED DESCRIPTION

Figure 1:
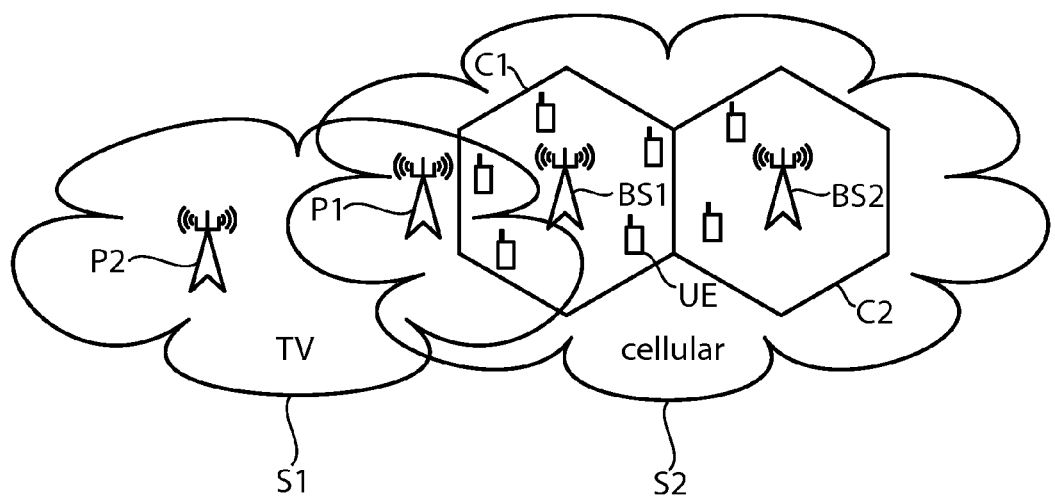
FIG. 1 is a schematic network diagram illustrating an exemplary spectrum-on-demand situation where embodiments of the invention may be applied.

FIG. 1 is schematic network diagram illustrating one, purely exemplary, spectrum-on-demand situation where embodiments of the present invention may be applied. In the figure, there are two radio communication systems S1 and S2 with intersecting coverage areas. Here, by way of example, the system S1 is a television broadcasting system, symbolically represented by two broadcasting antennas P1 and P2; and the system S2 is a cellular radio communication system, symbolically represented by two base stations BS1 and BS2, which provide radio coverage in cells C1 and C2, respectively. A number of user equipments (UE) serviced by the system S2 are also shown. The system S1 has a license for a spectrum band B1. However, the system S2, which has a license to another spectrum band B2, also wants to be able to exploit spectrum opportunities in the spectrum band B1. Consequently, the system S2 thus has a reliable spectrum band B2 in which it can schedule control signalling as well as data and other forms of communication. At the same time, if required or desired, it has the option to temporarily extend its available spectrum by using the less reliable spectrum band B1 as a secondary user. As long as a system load in the system S2 is low relative to the bandwidth of the spectrum band B2, it is probably not necessary for the system S2 to use resources in the spectrum band B1. However, when the load of the system S2 becomes high, the spectrum band B1 can be used by the system S2 for, e.g. (but not limited to), non time-critical transmissions, such as large file transfers and the like. Therefore, the system S2 needs to develop an awareness of the spectrum opportunities existing in the spectrum band B1, that is, radio resources (e.g. time/frequency resources or codes) in the spectrum band B1 which are currently not used by the system S1, or by any other system operating as secondary user in the spectrum band B1. Here it is assumed that the system S1 does not directly supply the system S2 with information on spectrum opportunities in the spectrum band B1. The system S2 therefore has to detect the opportunities itself by means of sensing. If the system S2, after having performed sensing, is confident that there are resources in the spectrum band B1 which are not being used by the system S1, the system S2 may choose to use those resources for its own traffic.

Figure 2:
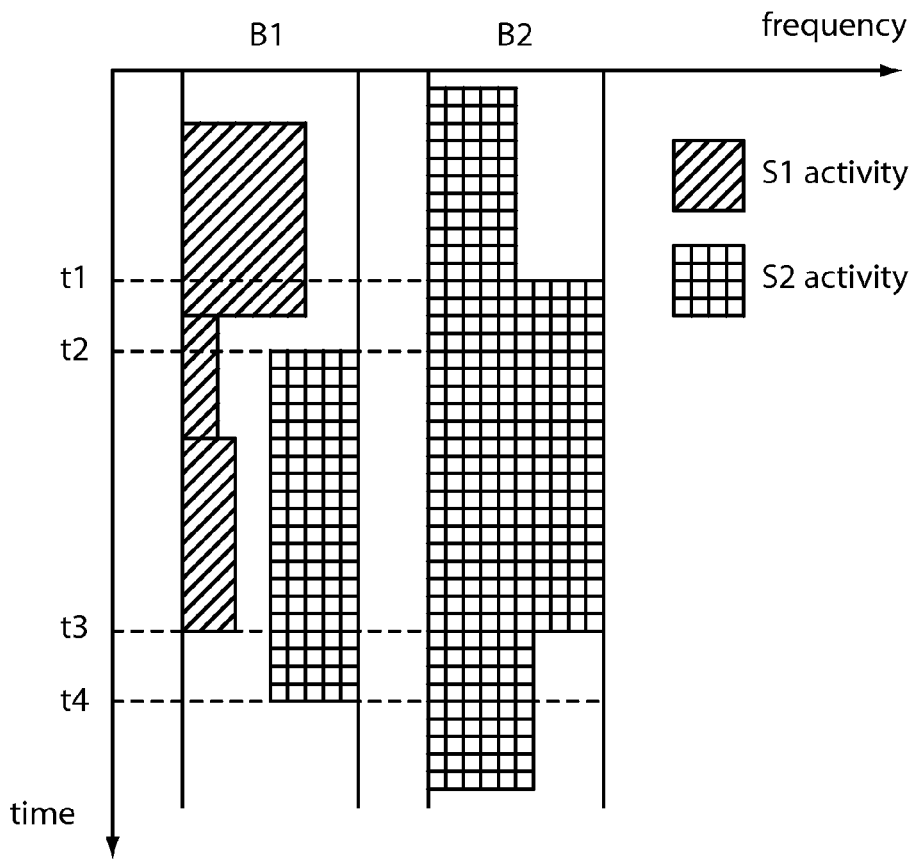
FIG. 2 is a frequency-time diagram illustrating spectrum-on-demand operation in the network situation illustrated in FIG. 1.

FIG. 2 is a frequency-time diagram that provides an example of spectrum-on-demand operation applied to the network situation of FIG. 1. At a time t1, the system S2 experiences an increased spectrum demand when its licensed spectrum band B1 becomes fully utilized. The system S2 starts to sense the band B1 in search for spectrum opportunities. At a time t2, system S2 has detected a spectrum opportunity and starts to use part of the spectrum band B1 in a secondary manner. At a time t3, the spectrum demand in the system S2 decreases but S2 still utilizes resources in B1. At a time t4, the spectrum demand decreases further and the system S2 abandons the spectrum band B1.

The sensing in the system S2 is preferably performed in a cooperative manner involving a plurality of sensors, in order to improve the sensing reliability. The nodes of the system S2, such as base stations and/or serviced user equipments, may act sensors.

Figure 3:
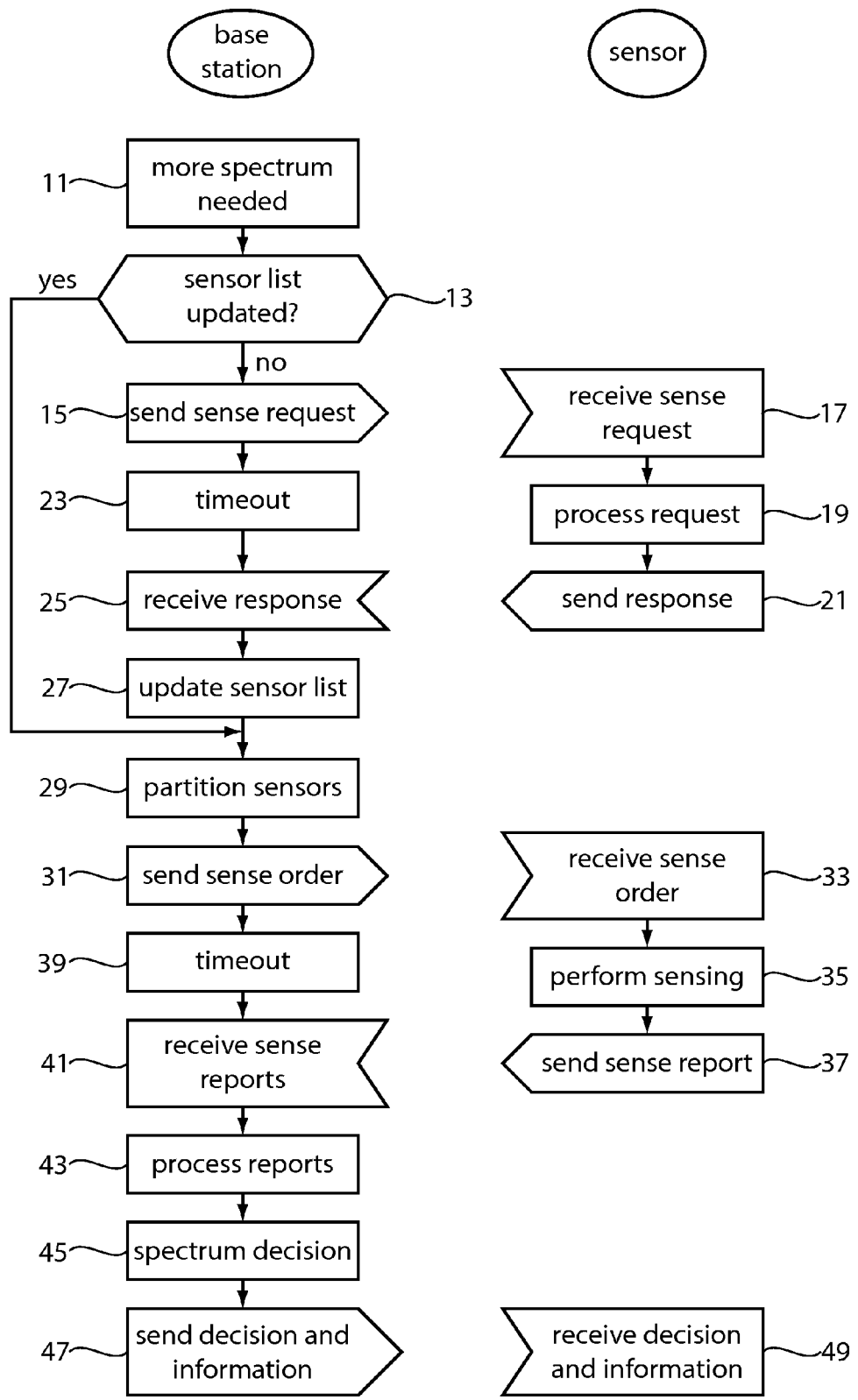
FIG. 3 is a flow chart illustrating a cooperative spectrum sensing operation according to an embodiment of the invention.

FIG. 3 is a flow chart that illustrates one example of cooperative sensing in accordance with an embodiment of the invention. The left side of FIG. 3 illustrates actions performed in a base station, which here act as an initiating node for the cooperative spectrum sensing. The right side of FIG. 3 illustrates actions performed in one exemplary sensor.

At a block 11, the base station determines that more spectrum is needed in order to support the communication demand. The base station maintains a list of sensors that can be seen as candidates for participation in cooperative sensing. This list thus contains a candidate set of sensors. Such a candidate set is a subset of a "total set", that is, all nodes in some geographical area. In embodiments, such as the one in FIG. 3, where selection of sensors for cooperative sensing is coordinated by a central node (e.g. a base station in a cellular system or a master node in an ad hoc network) the total set can be all nodes associated with that central node. Reasons why a particular node is not a member of the candidate set may be permanent factors, e.g., the node may lack the necessary functionalities, such as support of the spectrum band to be sensed, and/or temporary factors, e.g., the battery level of the node is too low to participate. After the block 11, the base station determines, at a block 13, whether the list is up to date. If the list is not up to date, the base station sends a sense request to all nodes associated the base station at a block 15. This sense request is then received by the sensors, illustrated by the exemplary sensor at a block 17. The exemplary sensor processes the sense request at a block 19 to determine whether it is currently a candidate for participation in cooperative spectrum sensing. In this particular example, it is assumed that the exemplary sensor is a candidate for cooperative spectrum sensing, and this is communicated to the base station in a response at a block 21. After a timeout 23 (meaning a time which the base station has to wait), the base station receives this response, and possibly similar responses from other nodes, at a block 25. Based on the received responses, the base station updates the sensor list at a block 27. When the base station has a sensor list that is up to date, the base stations partitions the candidate set into two sets, one active set and one passive set. The active set contains the sensors that will participate in the cooperative sensing at this particular time, and the passive set contains the sensors in the candidate set that will not participate in the cooperative sensing at this particular time. It, of course, suffices to determine one of these sets, e.g. the active set; the other set is then implicitly determined as well. Having established the active set, the base station sends, at a block 31, a sense order that orders all sensors in the active set to perform sensing. In this example it is assumed that the exemplary sensor is in the active set, and the exemplary sensor receives the sense order at a block 33. In response to the sense order, the exemplary sensor performs sensing at a block 35. After the sensing has been performed, the exemplary sensor sends a result of the sensing in a sense report to the base station at a block 37. After a timeout (i.e., waiting period) 39, the base station receives this sense report, and similar sense reports from other sensors in the active set, at a block 41, and the received sense reports are then processed by the base station at a block 43. The processing of the sense reports results in a spectrum decision at a block 45. The spectrum decision establishes whether or not one or more spectrum opportunities have been detected as a result of the cooperative spectrum sensing. At a block 47, the base station transmits the spectrum decision and possibly additional information to relevant system nodes (e.g., nodes which are scheduled for transmission or reception in the detected spectrum opportunities). In this particular example, the exemplary node receives this transmission at a block 49.

There are several reasons for the above-mentioned partitioning of the candidate set. One reason for not wanting all sensors to participate in the sensing activity is to reduce the energy consumption in the system. This is particularly important for battery powered sensors: repeated participation of the same sensor in the cooperative sensing will drain the battery of that sensor. It can also be shown that it is usually more important in cooperative sensing to have a large geographical spread of the sensors than having many sensors that experience correlated fading. The reason for this is that the probability of correlated shadow fading generally decreases with the sensor separation.

To reduce the power consumption in individual nodes, the partitioning of the candidate set into the active set and the passive set is allowed vary over time.

Furthermore, if a spectrum range to sense is divided into sub-ranges, there can be a separate active set for each frequency sub-range to sense.

Figure 4:
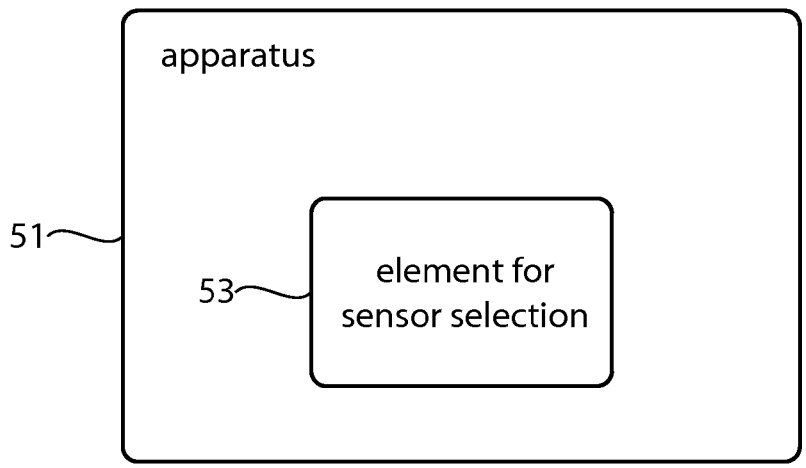
FIG. 4 is a block diagram illustrating an apparatus with an element for sensor selection according to an embodiment of the invention.
Figure 5:
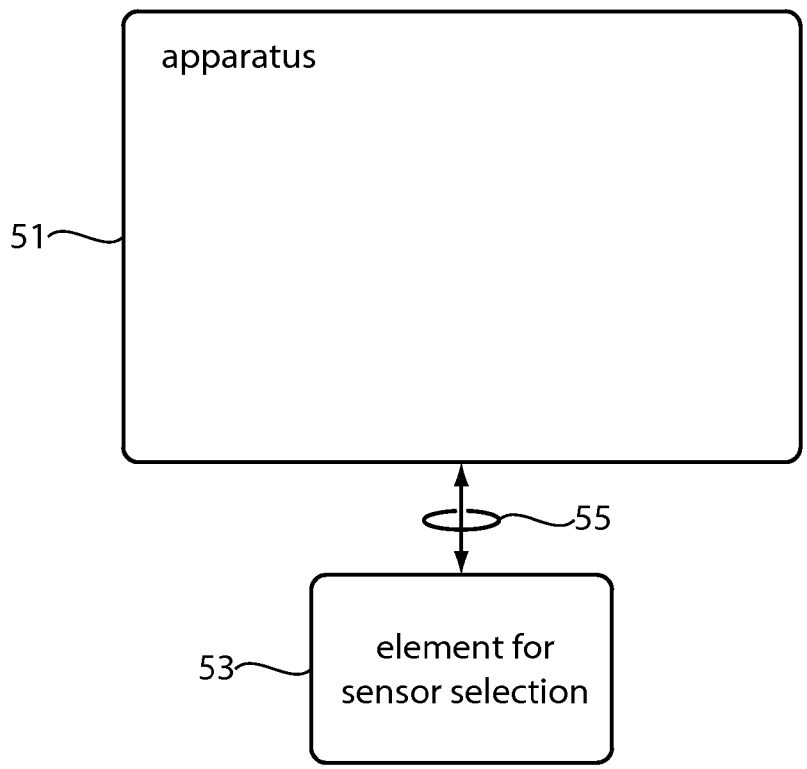
FIG. 5 is a block diagram illustrating an apparatus connected to an element for sensor selection according to an embodiment of the invention.

In the example of FIG. 3, the base station is responsible for partitioning the candidate set into the active set and the passive set, thereby in effect determining the sensors that should participate in the cooperative sensing. Of course, any apparatus, not necessarily a base station, which has access to an element for sensor selection can be made responsible for this partitioning of the candidate set. FIG. 4 is a schematic block diagram illustrating one example of such an apparatus 51. Here, an element for sensor selection 53 is provided and contained in apparatus 51. A similar block diagram is shown in FIG. 5. Here, however, the element for sensor selection 53 and the apparatus 51 are physically distinct units that communicate through a communication channel 55. The element for sensor selection 53 can be implemented in various ways employing standard circuit technologies, such as application specific circuitry, programmable circuitry, or any combination thereof. The person skilled in the art will appreciate that the element 53 may also fully or partly be implemented with one or more processors programmed with suitable software. The element 53 for sensor selection can be implemented as a single unit, or it can be distributed over several units, e.g., several processors in a device, or several communicating devices.

Figure 10:
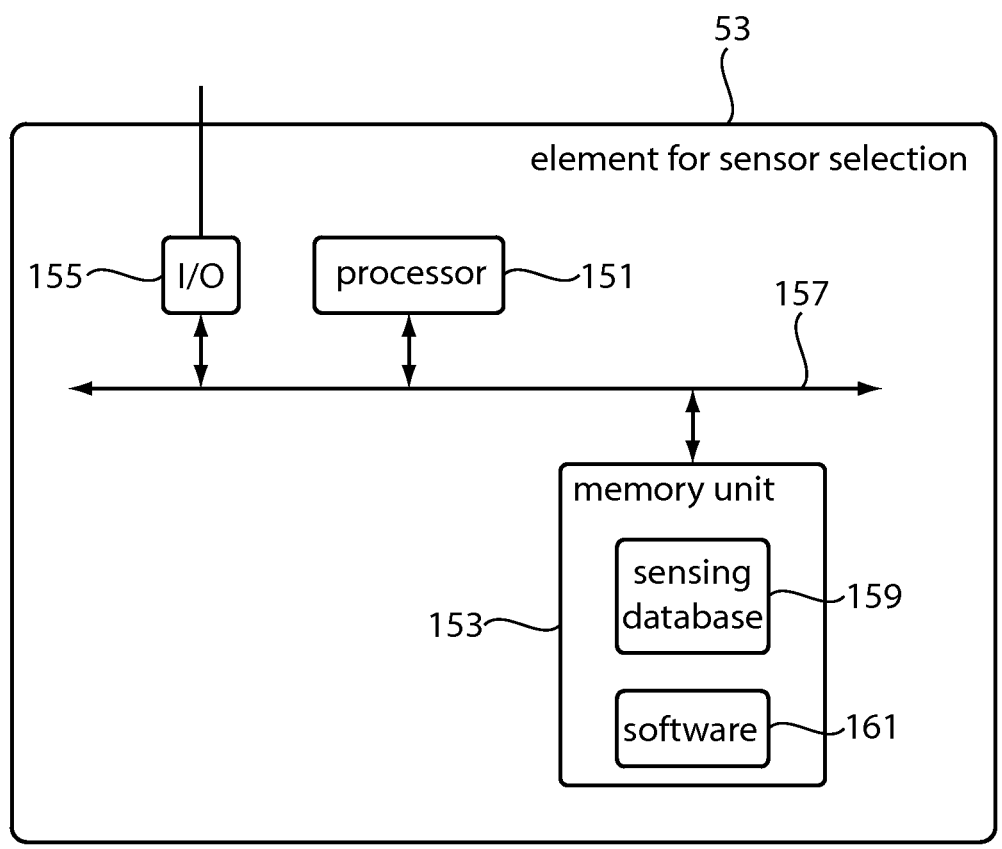
FIG. 10 is a block diagram that illustrates an element for sensor selection according to an implementation embodiment of the invention.

FIG. 10 is block diagram that illustrates a particular implementation embodiment of the element for sensor selection 53. In the embodiment of FIG. 10, the element for sensor selection 53 comprises a processor 151, a memory unit 153, and an input-output unit 155, which are all operationally connected, e.g. by means of a digital bus 157. The memory unit 153 stores a database 159 with information relevant the selection process. The database 159 includes information, which may initially have been received via the input-output unit 155, identifying the candidate set and other information relating to the candidate set, such as, for example, positioning information. The database 159 may also contain pre-stored data that can be used in the selection process, as will be exemplified below. The processor performs the selection process using software 161 and data that are provided by the memory unit 153 or via the input-output unit 155. As result of the selection process may be communicated via the input-output unit 155. The element for sensor selection 53 may in particular be configured to perform any one of the methods described and indicated below.

According to embodiments of the present invention, the partitioning of the candidate set into the active set and the passive set is performed by solving an optimization problem. Here, a cost formula is defined which describes how to calculate a cost for using a particular active set. The active set is then obtained by optimizing the cost in accordance with the cost formula, subject to suitable additional constraint(s), such as, for example, a desired number of sensors to be included in the active set.

Assuming that the candidate set S includes sensors s(1), ..., s(M), embodiments of the invention associate a cost associated with using a subset X of the candidate set S as an active set according to the following cost formula $$\text{cost}(X) = \sum_{i=1}^{M} \sum_{j=1}^{M} a_i a_j c_{ij}. \qquad (1)$$

Where the $c_{ij}$ (i,j=1, ..., M) are values referred to herein as cost measures, and where the $a_i$ (i=1, ..., M) are defined such that $a_i$ is 1 if sensor s(i) is a member of X and 0 if sensor s(i) is not a member of X. The cost measures $c_{ij}$ are fixed during the optimization procedure and may be viewed as components of a corresponding matrix C (the cost measure matrix). As is well understood by a person skilled in the art, the formula (1) formally defines a numerical cost function on a power set P(S) of the candidate set S. As is well known to a person skilled in the art, a power set of a set is the set of all subsets to the set in question. It is also instructive to rewrite (1) according to $$\text{cost}(X) = \sum_{k=1}^{M} a_k c_{kk} + \sum_{j=2}^{M} \sum_{i=1}^{j-1} a_i a_j (c_{ij} + c_{ji}). \qquad (1.1)$$

It can now be seen that the cost defined by the formula is an aggregate of "individual" costs and "pair-wise" costs. An individual cost is associated with each sensor which is a member of X and is given by a corresponding diagonal component of the cost measure matrix. A pair-wise cost is associated with each pair of distinct sensors that can be formed from members of X and is given by corresponding off-diagonal components of the cost measure matrix. Furthermore, it is also easily seen that the relationship between the cost measure matrix and the cost function is not one-to-one. That is, different cost measure matrices may result in the same cost function. However, if a restriction is made to particular types of matrices, such as the subspaces of symmetric or triangular matrices, the relationship can be made both one-to-one and onto, i.e. a bijection. This is not only of theoretical value, but is also practically useful, since it minimizes the number of cost measures that need to be determined and/or stored.

As will be seen below, the above-indicated cost formula can be applied in many practically interesting and useful situations.

Shadow fading arises from propagation loss behind large structures such as buildings and mountains. The shadowing is spatially correlated and one model of the correlation, which is a function of distance d between two terminals, R(d), is $$R(d) = e^{-ad}, \qquad (2)$$

where a is an environment parameter. In urban environments a≈0.1204, e.g., and in suburban environments a≈0.002, e.g., provided d is given in meters, see A. Ghasemi, E. S. Sousa, "Opportunistic Spectrum Access in Fading Channels Through Collaborative Sensing," Journal of Communications, vol. 2, no. 2, pp. 71-82, March 2007. Since the correlation is modelled by an exponentially decaying function, it can not be negative and it approaches zero in the limit (i.e. when d→infinity). The propagation environment can be characterized by a decorrelation distance, $d_0$, which is a minimum separation between sensors required for a shadowing correlation to fall below a pre-determined threshold. The correlation threshold is a design parameter that may be selected depending on a maximal acceptable correlation between any two sensors that result in reliable results from the cooperative spectrum sensing. The decorrelation distance $d_0$ can be obtained from the equation (2) above for a given correlation threshold. In the following we will use the term "uncorrelated shadowing" for shadowing correlation below the threshold, i.e., when the separation of the two sensors is larger than $d_0$. In exemplary embodiments below, the cost measures, by way of example, will be based on shadowing correlation (correlation hereinafter). In such cases the cost measures will be referred to as correlation measures. The pair-wise correlation measures $c_{ij}$ (i not equal to j) may then be based on the above-described correlation function, R(d), where d is now and estimated Euclidian distance between sensors s(i) and s(j). However, the correlation measures should usually be based on a combination of a correlation function, the positions of sensor pairs and associated positioning uncertainty, and possibly additional parameters. Regarding the pair-wise correlation measures $c_{ij}$(i≠j): Note that sensible correlation measures should be symmetric, so that $c_{ij}=c_{ji}$. In this case, only one of these two correlation measures needs to be determined and stored in a memory. Also, usually $c_{ii}=c_{jj}$, for all i and j (i.e., the correlation measure is always the same if the distance is 0, regardless of which sensor is being considered), which also reduces the memory requirements. Concrete examples on how to calculate appropriate correlation measures will be given later. However, as mentioned earlier, the embodiments of the invention should not be seen as limited to correlation measures. The use of correlation measures is one example of a cost measure which is relevant for the current application. For example, the methodology presented herein can be used in other applications to maximize distance(s) between selected sensors, which is strictly speaking not a correlation measure, i.e., minimize −1 times the distance(s).

Below, correlation measures will be used when illustrating various embodiments of optimized sensor selection. However, it should be remembered that much of the methodology presented is equally applicable to general cost measures.

Furthermore, in a particular embodiment, a cell may be partitioned in a number of sectors which are large enough so that the correlation measures only have to be computed between all sensor pairs in the current and nearby sectors (for other sensor pairs, the correlation measure can be approximated to 0).

Moreover, the exemplary algorithms to be described can be straightforwardly implemented regardless on if the sensor positions are known in one dimension only (if, e.g., estimates of the distance of the sensors from a certain point (such as the main node, e.g., the BS) are known), in two dimensions (the estimated sensor positions are on a surface) or in three dimensions—it even generalizes up to any number of dimensions. In a good implementation of the algorithm, however, the correlation measure used will depend on the dimensionality of the position estimates.

The optimization problem to be solved based on the cost formula (1) can thus be written as $$\min_{a_1,\ldots,a_M} \sum_{i=1}^{M} \sum_{j=1}^{M} a_i a_j c_{ij} \quad (3)$$

$$\text{subject to } \sum_{i=1}^{M} a_i = N$$

$$\text{and } a_i \in \{0, 1\}, i = 1, \ldots, M$$

The user parameter N indicates the desired number of sensors to use in the cooperative sensing, i.e. the desired number of sensors in the active set. Having determined the values $a_i^{opt}$ (i=1, . . . , M) which optimize (3), the active set A is then simply the sensors with indices i such that $a_i^{opt}$=1, i.e. formally A={s(i): 1≤i≤M and $a_i^{opt}$=1}. The passive set is of course the complement of A in S.

The problem (3) above is easily recognized an integer optimization problem and, as such, it can likely only be solved exactly by an exhaustive search—i.e. by testing all $$\binom{M}{N}$$

possible values of $\{a_i\}$, i=1, . . . , M, which fulfil the constraints. Such an exhaustive search is generally very time-consuming and is not recommended for implementation in the current sensing context. Instead, an algorithm which finds an approximate solution to the above problem by implementing a greedy approach is described herein: As a starting-point of the algorithm, all sensors are active, i.e. part of the active set.

The algorithm then iteratively removes sensors in a one-by-one fashion (always removing the sensor which has the largest summed correlation measure relative to the remaining sensors) until the desired number of sensors N has been obtained. Consequently, in each of the iterations, that sensor is removed, the removal of which results in the largest reduction in the cost, hence the name greedy approach.

In a particular embodiment, it is suggested that the algorithm can run in two modes. The appropriate mode should be selected based on the number of sensors available in the cell, on the processing power of the apparatus running the algorithm, and on how fast the solution needs to be obtained. E.g., Mode 1 can be used if the number of sensors available for sensing is lower than a pre-determined number K (K may be 0 or infinity, if one desires to always use one of the modes). Otherwise, Mode 2 will be used. Other criteria for selecting one of the two modes, or for combining them, are perfectly possible and are also covered by the invention.

Mode 1: In this mode, the estimated positions of the sensors are used directly, which means that all the pair-wise correlation measures between sensors have to be computed. Assuming that M sensors are available in a cell, there will be $$\binom{M}{2} = \frac{M(M-1)}{2}$$

pair-wise correlation measures to compute.

Figure 6:
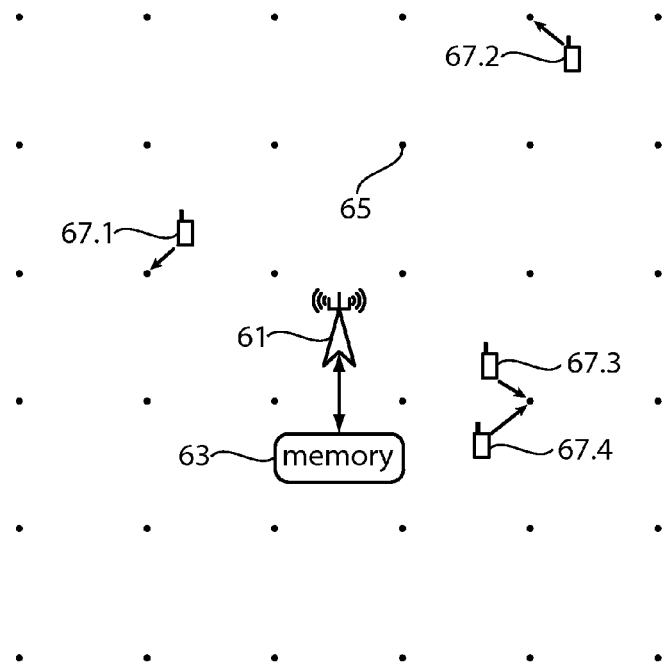
FIG. 6 is a view of a cell provided with predetermined grid points according to an embodiment of the invention.

Mode 2: If Mode 1 is deemed too computationally intensive (e.g., if there are too many sensors between which the pair-wise correlation measures have to be computed), the estimated sensor positions can be "rounded off" to the closest (according to some distance measure) grid points in the cell. The grid points are some pre-determined locations which are stored in (or at a point accessible to) a main node of the cell. Here, the main node is defined as the node running the partitioning algorithm (e.g., the BS in a cellular system). In this manner, each candidate sensor becomes associated with one of the grid points. The main node has the pre-computed pair-wise correlation measures between all grid points stored in memory, and therefore no computation of the pair-wise correlation measures is necessary. Only the grid points which have sensors associated to them are used, or "active". The grid points are assumed to lie closely enough spaced, so that the extra positioning error introduced by rounding off the sensor position has a relatively small effect on the pair-wise correlation measure. In fact, this extra positioning error can be included in the correlation measure by exploiting the grid point spacing in the calculation of the measure. FIG. 6 is schematic cell diagram which illustrates these principles. A main node, here a base station 61, is located in a cell with predefined grid points, and one such grid point is referred to with reference numeral 65. The base station is connected to or includes a memory 63, which stores the pair-wise correlation measures associated with the predefined grid points. By way of example, four user equipments 67.1-67.4, which can act as sensors, are currently in the cell. Each one of these user equipments is associated with the grid point which is closest, and these closest grid points are the active grid points. Here, the user equipments 67.1 and 67.2 are associated with different grid points, whereas the user equipments 67.3 and 67.4 are associated with the same grid point.

Assuming that the correlation measures have been obtained, where the measures have been taken between sensors for Mode 1, or between active grid points for Mode 2, an algorithm runs as follows, where we let "elements" denote "sensors" if the algorithm runs in Mode 1, and "active grid points" if the algorithm runs in Mode 2.

1. Let P denote "the number of elements" and number the elements from 1 up to P.
2. Let $$k := \arg\max_{i \in \{1,\ldots,P\}} \sum_{j=1}^{P} c_{ij}.$$

3. Remove the element number k from consideration, number the remaining elements from 1 up to P−1, and then set P:=P−1.
4. If P<=N we are done. Otherwise, go to 2.

After finalization of the algorithm, we have N elements. If the algorithm was run in Mode 1, the active sensors are the same as the remaining elements. If the algorithm was run in Mode 2, the sensors are obtained by picking one sensor from each of the remaining elements. For elements which have more than one sensor associated with them, the selection can, e.g., be based on battery capacity of the sensors, sensing capabilities, or the sensor can be picked at random.

The element k which maximizes the equation in point 2 is the element which has the greatest summed correlation measure to the remaining elements. Therefore, if the goal is to minimize the total correlation between the remaining sensors, element k should be removed.

If, however, the number of available sensors is less than the desired number of sensors N, the algorithm never runs. Instead, the best-effort approach can be used, and all available sensors take part in the sensing.

It is straightforward to rewrite the above-described algorithm such that the starting point of the algorithm has a single active sensor (e.g., the sensor of a main node), and the other sensors passive. The passive sensors are then turned active in a one-by-one fashion, where the sensor to be activated is the passive sensor which has the minimum value of the summed correlation to the already active sensors. In the above algorithms the stopping criteria used was that the number of remaining sensors reached a specified threshold. Also other stopping criteria are perfectly viable and covered by the invention. Such stopping criteria may be based, e.g., on the number of remaining sensors, the respective correlation of those, the mean correlation value of the remaining sensors, etc.

Moreover, also other types of algorithm based ideas described herein are perfectly possible and covered by the invention. For example, one could start with a set number of sensors (e.g., N) and then take turns to add and remove (or vice versa) a number of sensors for a number of iterations, using criteria similar to those discussed above, until a stopping criterion is reached. E.g., one can stop after a fixed number of sensor additions or removals, or when the algorithm reaches a local minimum, such that the same sensor(s) that where added are then directly removed (or vice versa).

In yet another alternative embodiment, the values of the summed correlation measures in point 2 above can be used as a basis for letting a stochastic variable decide which element to remove. Then, an element for which the corresponding summed correlation measure becomes large should have a larger chance of being removed. The values $$\sum_{j=1}^{P} c_{ij}$$

could, e.g., describe intervals on a line, and a stochastic variable uniformly distributed over the entire length then decides which element to remove by falling into the specific interval corresponding to an element.

Figure 7:
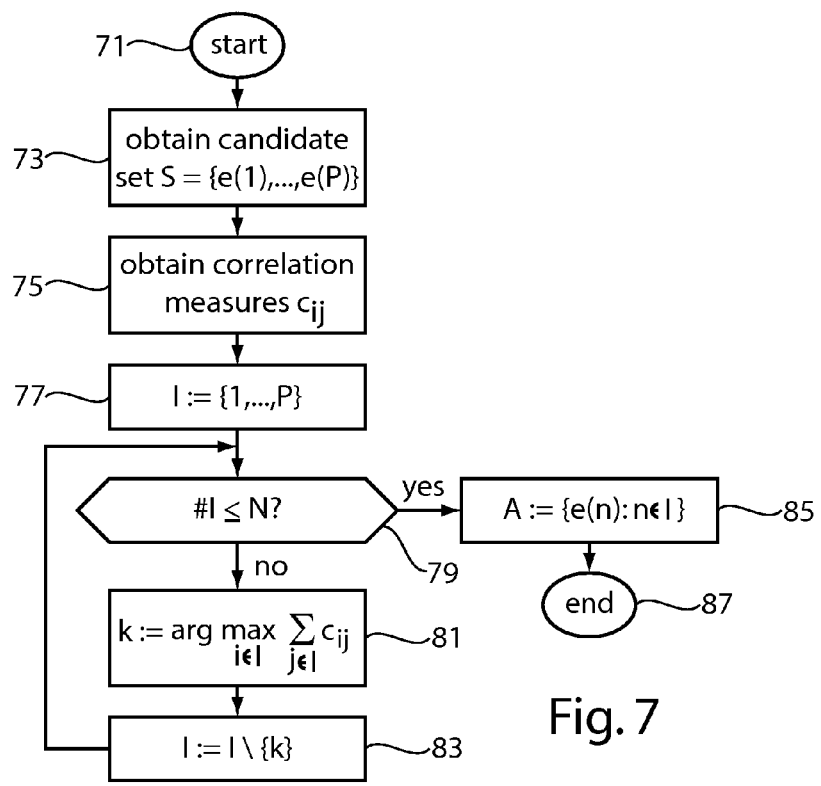
FIG. 7 is a flow chart that illustrates an optimization procedure for selection of sensors or active grid points according to an embodiment of the invention.

FIG. 7 is a flow chart that illustrates an implementation embodiment of the above-suggested optimization algorithm for selecting "elements" to the active set, but with a slight twist that avoids the cumbersome renumbering of the elements. After a start 71, a candidate set S including P elements e(1), . . . , e(P) is obtained at a block 73. For Mode 1, the elements are sensors. For Mode 2, the elements are active grid points. At a block 75, correlation measures relevant to the elements in question are obtained. An index set I is now introduced in order to avoid renumbering. At a block 77, the index set I is initially set to {1, . . . , P}, reflecting a starting position for the greedy optimization procedure where all elements are initially assumed to be in an active set. Thereafter, at a block 79, it is checked whether the number of members (#I) in the index set I is less than or equal to the desired number N of participants in the cooperative spectrum sensing. Assuming for now that this is not the case, an index value k associated with an element e(k) that is to be removed from the active set is calculated at a block 81. The index value k is here calculated according to $$k = \operatorname*{argmax}_{i \in I} \sum_{j \in I} c_{ij}. \tag{4}$$

It can be shown that the element e(k) is the element currently in the active set which, when removed from the active set, causes the greatest cost reduction in accordance with the cost formula. At a block 83, the index set I is modified by removing the value k from the index set I. Here, this operation is expressed compactly as a set difference between the index set I and a set {k}. The removal of the value k from the index set I is of course equivalent to removing the element e(k) from the active set. After the block 83, the method returns to the block 79, and the process is repeated as described until the number of members in the index set I equals the desired number of elements N for the active set. Then, at a block 85, the active set A is finally established as including the elements for which the corresponding index values are still in the index set I. After the block 85, the optimization procedure of FIG. 7 ends at a block 87. If the number of elements in the candidate is less than the desired number N, then a best effort attempt is made by including all elements in the active set at the block 85. Moreover, for Mode 2, the elements (active grid points) must subsequently be translated into sensors, e.g. by picking, for each active grid point in the active set, a sensor that is associated with that grid point.

Note, however, that the above formula (4) for calculating k applies to the case with correlation measures with the particular structure mentioned earlier. If, instead, general cost measures are used, a slightly more general formula may be used, which a person skilled in the art easily can derive from equations (1), (1.1) or (3). Clearly, if a single element e(n) is removed from the active set, all terms in the cost formula where at least one of the index values i or j is equal to n will disappear, thereby resulting in a corresponding cost reduction. A value of n for which the corresponding cost reduction is maximal is then used as the value k above, that is, $$k = \underset{n \in I}{\operatorname{argmax}} \sum_{\substack{i,j \in I \\ \text{and} \\ i=n \text{ and/or } j=n}} c_{ij}. \qquad (4.1)$$

In the embodiment of FIG. 7, the starting point was that all elements were in the active set (of elements), and element after element was then removed until the active set reached a suitable size N. As mentioned above, it is also possible to start with the active set empty, or including a single element, and instead add element after element to the active set based on cost considerations. The embodiment of FIG. 7 can easily be modified to account for this possibility. It is then convenient to introduce also a second index set J, which includes the index values of those elements that have not yet been selected to the active set. Consequently, with this approach, the index set I is initiated as the empty set and the index set J is initially set to $\{1, \ldots, P\}$, indicating that all elements are available for selection to the active set. Alternatively, the index set I may initially include a particular index value corresponding to some special element, e.g. a coordinating node, if such a node has sensor capabilities; this particular index value is then of course also removed form the index set J. An index value k is now calculated according to $$k = \underset{i \in J}{\operatorname{argmin}} \left\{ \left( \sum_{j \in I} c_{ij} \right) + c_{ii} \right\},$$

where correlation measures with the above-mentioned structure are again assumed. The value k is then added to the set I and removed from the set J, indicating that element e(k) is now in the active set and that it cannot be selected again. The element e(k) is an element that causes a minimal increase in the cost when be added to the active set. The procedure can now be repeated until the index set I has N members, assuming the candidate set includes a sufficient number of members. For the convenience of the reader, this procedure is also summarised below with a simple pseudo program code, and using standard set notations and operations to achieve a compact presentation:

obtain candidate set of elements $\{e(1), \ldots, e(P)\}$;
read particular_index_value;
I:={particular_index_value};
J:=$\{1, \ldots, P\}$\{particular_index_value};
repeat $$k := \underset{i \in J}{\operatorname{argmin}} \left\{ \left( \sum_{j \in I} c_{ij} \right) + c_{ii} \right\};$$

Figure 8:
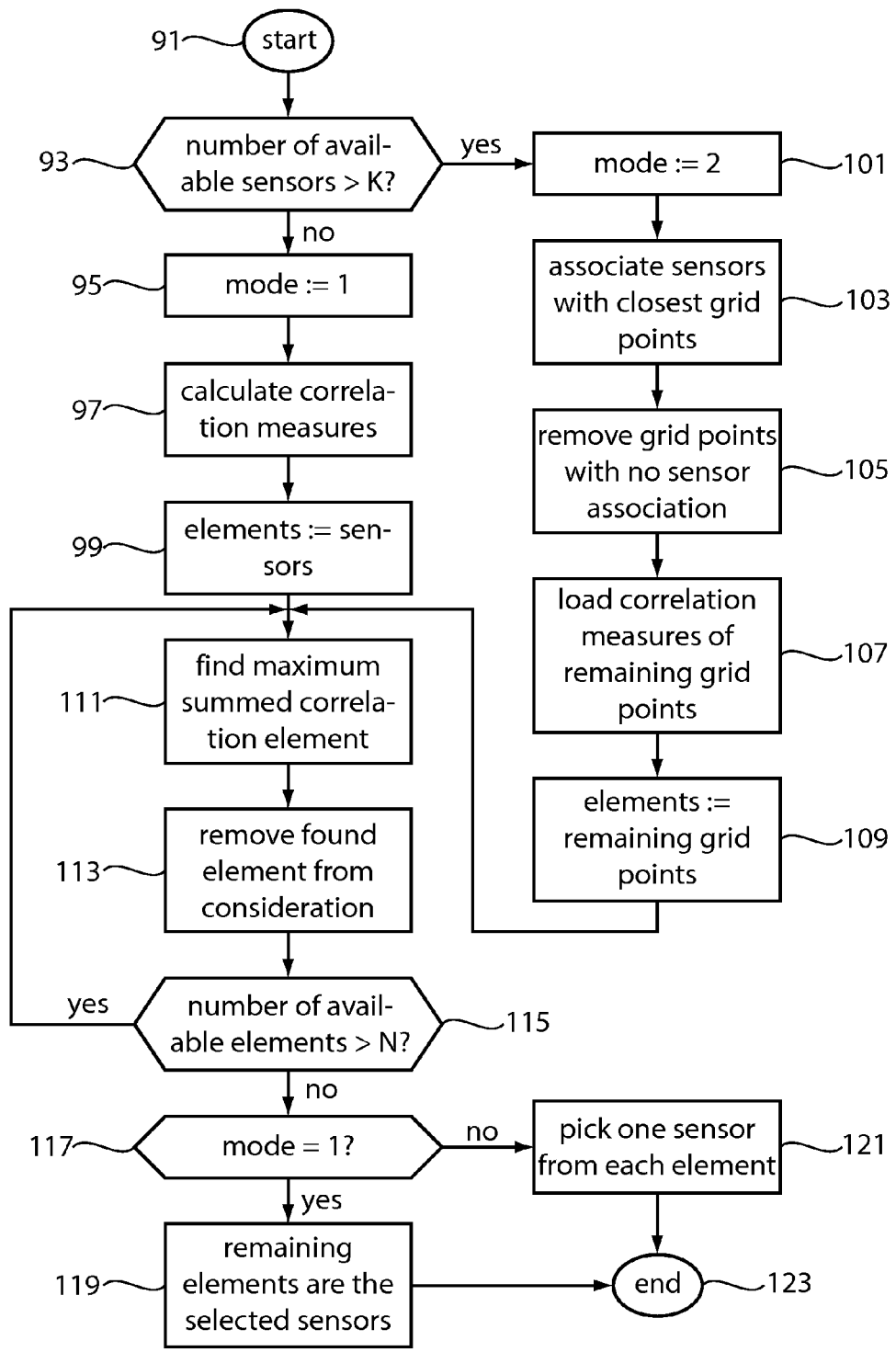
FIG. 8 is flow chart that illustrates a two-mode procedure for sensor selection according to an embodiment of the invention.

I:=I∪{k};
J:=J\{k};
until #I=N or J=Ø;
A:={e(i):i∈I}; if mode=Mode 2 then translate A into an active set of sensors;

FIG. 8 is flow chart that summarises with an exemplary embodiment the overall two-mode procedure. Here, it is assumed that the number of sensors in the candidate set exceeds the desired number N of sensors for the active set. After a start 91, it is determined whether the number of sensors in the candidate set exceeds a threshold value K at a block 93. If not, the procedure will run in Mode 1 and a mode variable is set to 1 at a block 95. Thereafter, at a block 97, correlation measures associated with the sensors in the candidate set are calculated. At a block 99, it is indicated that the "elements" are now sensors. If, on the other hand, the number of available sensors exceeds the threshold value K, the method will run in Mode 2, and the mode variable is set to 2 at a block 101. At a block 103, each sensor is then associated with its closest grid point. The grid points that do not receive any sensor association are removed from consideration at block 105. Then, at a block 107, correlation measures of the remaining (the active) grid points are loaded from the memory 63. At a block 109, it is indicated the "elements" are now the remaining grid points. The optimization procedure is now performed in same manner for Mode 1 as well as Mode 2. At a block 111, an element having a maximum summed correlation is found, and this element is then removed from consideration at a block 113. At a block 115, it is checked whether the number of available elements is still greater than the desired number N of elements. If this is the case, the method returns the block 111 and is thus repeated as described until the number of available elements equals N. Thereafter, at a block 117, it is checked in what mode the method is operating. If the mode is Mode 1, then the remaining elements, being sensors, constitute the final active set of sensors to be used for cooperative sensing. If the mode is Mode 2, then, at a block 121, one sensor associated with each remaining element is picked for the active set of sensors to be used for the cooperative spectrum sensing. Once the active set of sensors has been established, the method ends at a block 123.

The algorithm itself is not dependent on the use of a specific correlation measure. However, to illustrate what type of correlation measures can be used, and how to combine positioning uncertainty and correlation function, some examples of correlation measures are given below.

Assume that the positions of the respective sensors are given with some uncertainty. E.g., the positions may be estimated by the sensors using the global positioning system (GPS) and reported to the coordinating node, or the estimation of positions is supported by the network, e.g., by letting the nodes listen to several nodes with known positions (such as BSs) and estimating the propagation delay, and thereby the distance, from those nodes. When these distances and the corresponding node positions are known, the position may be estimated. The positioning uncertainty is associated with the performance of the respective positioning algorithm, and is assumed to be known with some precision. The position uncertainty may also in certain cases be modelled as a normal distribution, centred at an estimated expected position of a sensor and with a standard deviation that represents the uncertainty in the positioning system used.

Assume that the position of a sensor $s(i)$ can be described by the stochastic variable $x_i$ and that the position of sensor $s(j)$ can similarly be described by the stochastic variable $x_j$. Probability density functions (describing positioning uncertainty) of these stochastic variables are then, respectively, $p(x_i)$ and $p(x_j)$. A distance vector between $x_i$ and $x_j$ can be described by the stochastic variable $d_{ij}$, which has a corresponding probability density function $p_m(d_{ij})$.

The correlation function, which can be different for different types of environment (urban, suburban, etc), is generally a function of the (scalar) distance $d$ between two locations: $R(d)$. The vector valued distance, $d_{ij}$, can be mapped to a scalar distance $d$ by taking an appropriate norm, that is, $d=\|d_{ij}\|$.

Since $d_{ij}$ is a stochastic variable it is suggested, as one possible embodiment, to use, as correlation measure, the expected value of the correlation function conditioned on the distribution of $d_{ij}$:

$$c_{ij}=E\{R(\|d_{ij}\|)|p_m(d_{ij})\}=\int R(\|d_{ij}\|)p_m(d_{ij})dd_{ij} \quad (5)$$

If $d_{ij}$ is 2-D Gaussian distributed and if the norm $\|\cdot\|$ is the Euclidian norm, one can show that $\|d_{ij}\|$ has a Ricean distribution. If the algorithm above runs in Mode 2, the above equation can be computed offline for all pairs of grid points.

Provided the probability density function describing the distance vectors are circularly symmetric, independent and identically distributed (with exception of the mean values), the above expression can be computed offline and tabulated for a number of distance values. For convenience, the subscripts $i$ and $j$ will be dropped for the moment. Describe by $m$ the mean value of the distribution $p_m(d)$, where $d$ denotes a distance vector. Then, letting $R_v(d)$ describe a vector input version of $R(d)$; that is, $R_v(d)=R(\|d\|)$. A corresponding correlation measure can now be obtained by $$c(m)=E\{R_v(d)|p_m(d)\}=E\{R_v(d)p_0(d-m)\}=\int R_v(d)p_0(m-d)dd \quad (6)$$

where $p_0(\cdot)$ denotes $p_m(\cdot)$ shifted to zero-mean, and the arguments of $p_0(\cdot)$ can be multiplied by $-1$ after the third equality because the distribution is symmetric around 0. The above equation is easily recognized as a convolution, and since both $R_v(\cdot)$ and $p_0(\cdot)$ are symmetric around 0, the above equation will result in the same value of $c(m)$ for all values of $m$ having identical norm, under the assumptions above. This means that the function $c(\cdot)$ defined by equation (6) can be "factored" over the norm, so that $c(\cdot)=c'\circ\|\cdot\|$, where $c'(\cdot)$ is a function of a single scalar variable, and where $\circ$ denotes composition. The equation can thus be pre-computed for a number of measured scalar distances $\|m\|$ and corresponding values $c'(\|m\|)$ can be tabulated and stored in the memory. In this manner, no "on-line" computation is necessary for calculating the correlation measures $c_{ij}$. Consequently, to obtain a correlation measure between two sensors $s(i)$ and $s(j)$, a distance $D$ between the sensors is first estimated, and then the value $c'(D)$ is retrieved from the memory as the pair-wise correlation measure associated with these sensors.

Another type of correlation measure is based on computing a value $T_{ij}$ which is larger than the distance $\|d_{ij}\|$ with a set confidence level. Then one can instead use as correlation measure $$c_{ij}=R(T_{ij}).$$

As mentioned above, in a more general context $c_{ij}$ can be viewed as a cost measure. Then, $R(d)$ can be a function which does not directly describe the correlation, but rather gives a notion of how the sensing performance is hurt by sensor distance. E.g., $R(d)$ can be much larger and more slowly decaying within the decorrelation distance $d_0$ than what is suggested by the exponential decay.

Finally, it may be noted that there is a rather large uncertainty inherent in, e.g., the functional description of the correlation offered by $R(d)$ and other factors. Therefore, approximations of the above correlation measures, or ad hoc solutions, may also perform well. For instance, if the positioning uncertainty is very low compared to the distance between the distribution means, the correlation function $R(d)$ could be used directly as a correlation measure, where $d$ is set to the distance vector norm between the two locations (thereby, ignoring the positioning uncertainty, which is small anyway in this case). Another option is to convolve the correlation function with two 1-D functions describing the positioning uncertainty of the two locations, respectively, and then use the resulting 1-D function as correlation measure, again giving the norm distance between the location mean values as input.

Above, the correlation measures of the form $c_{ii}$ were all assumed equal. As is well understood by a person skilled in the art, these correlation measures will then not influence the optimization procedure that determines the active and passive sets. However, it is not necessary to make this assumption. Note that the value $c_{ii}$ can be used to describe the attractiveness of using sensor number $i$ as compared to the other sensors. For example, sensor number $i$ may be known to have larger battery and better sensing performance than sensor number $j$, then one could set $c_{ii}<c_{jj}$. Similarly, if a main node has very good sensing capabilities (e.g., the main node is a BS in a cellular system), the corresponding $c_{ii}$ value could be set very low, even to minus infinity, to guarantee that this sensor will be used in the sensing. The same could also apply to fixed sensors, for example, at repeaters owned by the sensing system.

Figure 9:
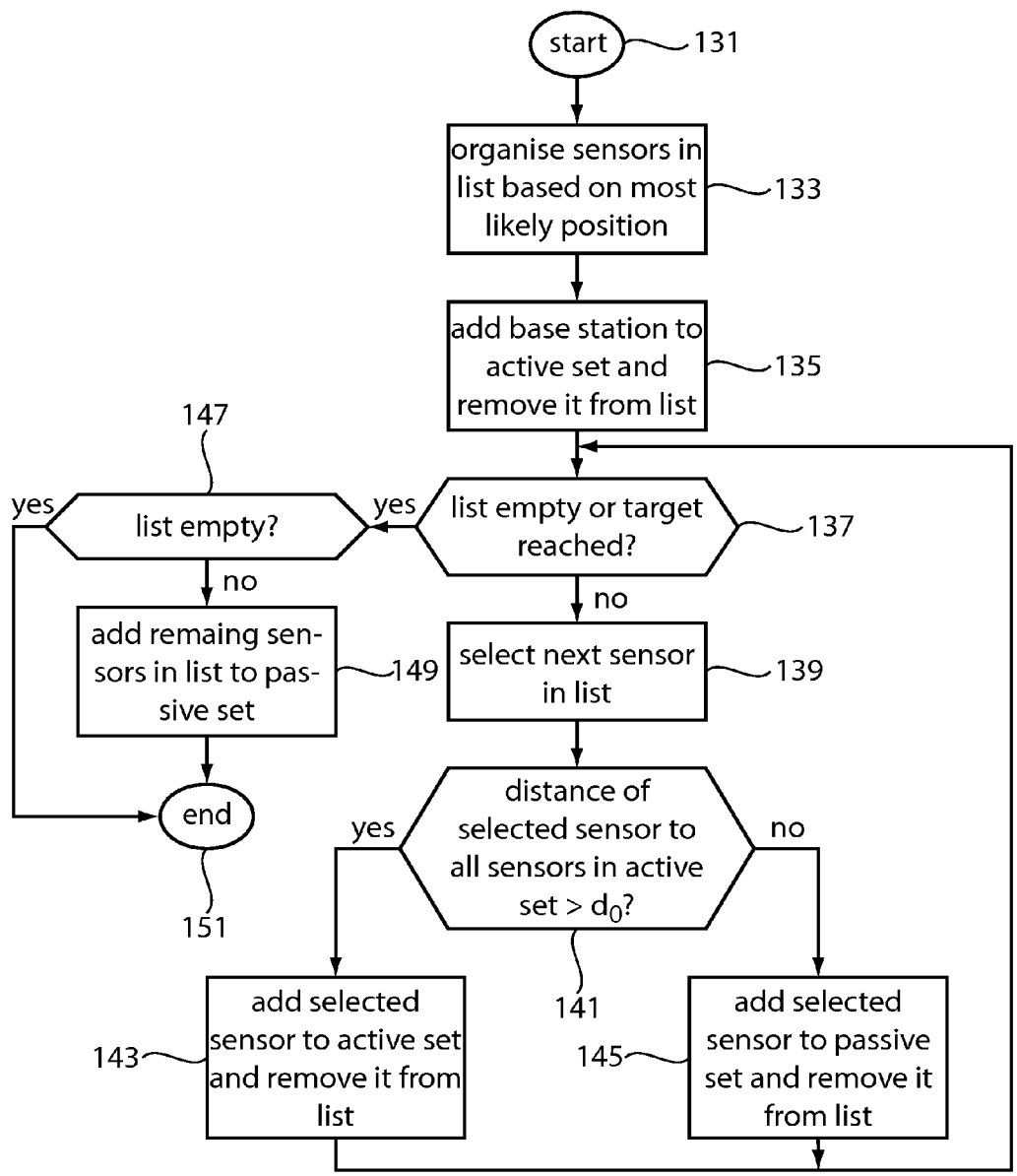
FIG. 9 is a flow chart that illustrates a method of iterative generation of active and passive sensor sets according to an embodiment of the invention.

A further example of an embodiment of the present invention on how to implement the partitioning of the sensors to, with high probability, achieve a large fraction of totally uncorrelated sensors in the active set. This algorithm iteratively partitions the sensors into the two subsets; the active set and the passive set. The inputs to this algorithm are the estimates of the positions of the sensors that are available for sensing, and the decorrelation distance $d_0$. The algorithm starts with the active set containing only the main node (e.g., the base station in a cellular system). Here it is assumed that the main node in the example implementation of the invention has spectrum sensing abilities. This not being the case is not a limitation of the invention—instead an arbitrary node can be used as starting sensor. Then the algorithm investigates, sensor by sensor, whether or not the individual sensors are at positions further away from all the present sensors in the active set than the decorrelation distance $d_0$ (possibly, also an extra margin for positioning uncertainty can be added). If this is the case for a sensor it is added to the active set and if this is not the case for the sensor it is added to the passive set. This procedure iteratively increases the size of the active set until we have reached a predefined target number N of sensors to participate in the cooperative sensing activity, or until all sensor positions have been investigated and no further sensors are available for consideration (best effort). Such a target value for the maximum number of sensors that are allowed to participate in the sensing may or may not exist. The point being that the non-existence of such a value should not invalidate the invention. If a predefined target number N of sensors exists and is reached before all the sensor positions have been compared to the active set, the remaining sensors are added to the passive set. FIG. 9 is flow chart that illustrates an implementation embodiment of this approach to sensor selection. After a start 131, sensors in a candidate set are organised in a list based on their estimated positions at a block 133. The sensors may, for example, be sorted by increasing distance to the base station. At a block 135, the base station is added to the active set and then removed from the list. At a block 137, it is checked whether the list is empty or if the target number N of active sensors has been reached. Assuming for now that none of these conditions are met, then the method proceeds to a block 139, where a next sensor is selected from the list. It is then checked, at a block 141, whether the selected sensor has distance to each sensor in the active set that greater than the decorrelation distance $d_0$, or, alternatively, greater than the decorrelation distance $d_0$ plus an extra margin $\mu$. If this is the case, the selected sensor is added to the active set and is then removed from the list at block 143. Otherwise, the selected sensor is added to the passive set and is then removed from the list at a block 145. Once the selected sensor has been removed from the list, the method returns the block 137, and the method thus proceed as described until at least one of the conditions is met at the block 137. When this happens the method continues, at a block 147, by checking whether the list is empty or not. If the list is empty, the method ends at a block 151. Otherwise, any remaining sensor in the list is added the passive set at a block 149 before the method ends at the block 151.

The embodiment illustrated in FIG. 9 is not unrelated to previous embodiments. The method of FIG. 9 can be viewed as "implicitly" assuming correlation measures having the form $$c_{ij} = \begin{cases} 0 & \text{when a distance between } s(i) \text{ and } s(j) \text{ is greater than } d_0 \\ \infty \text{ (infinity)}, & \text{otherwise,} \end{cases}$$

when i and j are not equal and $c_{ii}$=const. for all relevant values of i. The method of FIG. 9 may therefore, as an alternative, be run as a cost optimization using any one of the optimization procedures described and indicated above and using correlation measures of the above-indicated form, and this alternative is also included herein as an embodiment of the invention.

The methods described above have been evaluated in simulations, considering both the pair-wise correlations between the selected sensors, according to a correlation model, and the actual detection performance of the selected sensors, using energy detection and a K-out-of-N detector (i.e., if K or more of the N used sensors detect primary usage, then the system decides that primary use is taking place, otherwise the system decides that no primary user is active). The conclusion from the evaluation is that the pair-wise correlations between the selected sensors becomes lower than when the same number of sensors are selected at random. Also, the sensing performance is improved when using sensors selected by the algorithms described above as opposed to random selection of the same amount of sensors. This in terms of improved probability of primary user detection and/or reduced probability of false alarm (i.e., reaching a false decision that a primary user is active, leading to a missed spectrum opportunity).

Above, the invention has been illustrated with various embodiments. These embodiments are, however, intended only as non-limiting examples, and the scope of protection is instead defined by the appending claims.

The invention claimed is:

1. A method relating to cooperative spectrum sensing, the method comprising:
   Obtaining, by a sensor selector, a candidate set of sensors that are available to participate in the cooperative spectrum sensing, wherein spectrum sensing is the act of determining, by monitoring radio transmissions, whether a particular spectrum band is currently at least in part free for use, wherein the sensor selector comprises a processor and a memory unit and the step of obtaining the candidate set is performed by the processor;
   defining a cost formula for calculating a cost associated with using sensors from the candidate set in the cooperative spectrum sensing; and
   partitioning, by the processor, the candidate set into an active set containing one or more sensors of the candidate set to participate in the cooperative spectrum sensing and a passive set containing one or more sensors of the candidate set not to participate in the cooperative spectrum sensing by applying an optimization procedure which performs a constrained optimization of the cost in accordance with the defined cost formula.

2. The method according to claim 1, wherein there are M sensors in the candidate set which are numbered from 1 to M, and wherein the cost formula is $$\sum_{i=1}^{M} \sum_{j=1}^{M} a_i a_j c_{ij},$$

where $c_{ij}$, i,j=1, ..., M, denote predetermined values which are fixed during the optimization procedure and where the $a_i$, i=1, ..., M, are defined to be equal to one if the sensor number i is in the active set and zero if the sensor number i is in the passive set.

3. The method according to claim 2, wherein the values $c_{ij}$, i,j=1, ..., M, are a measures of shadowing correlation between sensor number i and sensor number j.

4. The method according to claim 3, wherein the measures of shadowing correlation are based at least in part on a correlation function modelling shadowing correlation in dependence of at least a distance between sensors.

5. The method according to claim 4, wherein the measures of shadowing correlation are further based at least in part on positioning uncertainties of the sensors in the candidate set.

6. The method according to claim 5, wherein the measures of shadowing correlation are obtained by calculating an expected value of the correlation function conditioned on a probability distribution of vector distances between sensors.

7. The method according to claim 1, wherein the method further comprises determining whether to conduct the method in a first mode or a second mode, the second mode being less computationally intensive compared to the first mode.

8. The method according to claim 7, wherein the first mode comprises defining the cost formula as $$\sum_{i=1}^{P} \sum_{j=1}^{P} a_i a_j c_{ij},$$

where P is the number of sensors in the candidate set, the sensors in the candidate being numbered from 1 to P, where the $c_{ij}$, i,j=1, ..., P, are predetermined values which are fixed during the optimization procedure, and where the $a_i$, i=1, ..., P, are defined to be equal to one if the sensor number i is in the active set and zero if the sensor number i is in the passive set.

9. The method according to claim 7, wherein the second mode comprises:
associating each sensor in the candidate set with a closest grid point from a predefined set of grid points;
removing from consideration any predefined grid point which has no sensor associated with it;
defining the cost formula as $$\sum_{i=1}^{P}\sum_{j=1}^{P} a_i a_j c_{ij},$$

where P is the number of grid points still under consideration, the grid points still under consideration being numbered form 1 to P, where the $c_{ij}$, i,j=1, ..., P, are values which are loaded from a memory, and which are fixed during the optimization procedure, and where the $a_i$, i=1, ..., P, are defined to be equal to one if the grid point number i is in an active set of grid points and zero if the grid point number i is in a passive set of grid points; and
translating the active set of grid points into the active set of sensors to be used in the cooperative spectrum sensing.

10. The method according to claim 1, wherein the optimization procedure is a greedy optimization approach.

11. The method according to claim 1, wherein the optimization procedure is subject to a constraint specifying a number of sensors that should be in the active set.

12. A method relating to cooperative spectrum sensing, the method comprising:
Obtaining, by a sensor selector, a candidate set of sensors that can participate in the cooperative spectrum sensing and estimates of positions of the sensors in the candidate set, wherein spectrum sensing is the act of determining, by monitoring radio transmissions, whether a particular spectrum band is currently at least in part free for use, wherein the sensor selector comprises a processor and a memory unit and the step of obtaining the candidate set is performed by the processor;
selecting, by the sensor selector, a first sensor from the candidate set and including the first sensor in an active set of sensors which are to participate in the cooperative spectrum sensing;
selecting, by the sensor selector, a next sensor from the candidate set which has not previously been selected;
adding the selected next sensor either to the active set or to a passive set, the selected next sensor being added to the active set if and only if a distance from the selected next sensor to each sensor already in the active set is greater than a threshold value, the threshold value being greater than or equal to a predetermined decorrelation distance; and repeating, if necessary, the steps of selecting a next sensor and adding until a number of sensors in the active set has reached a predetermined target level or until all sensors in the candidate set have been added in the active or passive set.

13. The method according to claim 12, wherein the method further comprises organizing the sensors of the candidate set in a ordered list based on the estimates of positions and performing the steps of selecting in the order prescribed by the list.

14. The method according to claim 13, wherein sensors appear in the ordered list based on increasing distance from a base station.

15. An element for sensor selection, the element characterised by being configured to perform a method according to claim 1.

16. An element for sensor selection relating to cooperative spectrum sensing, the element characterised by being configured to perform the steps of:
obtaining a candidate set of sensors are available to participate in the cooperative spectrum sensing;
defining a cost formula for calculating a cost associated with using sensors from the candidate set in the cooperative spectrum sensing; and
partitioning the candidate set into a an active set containing any sensor(s) of the candidate set to participate in the cooperative spectrum sensing and a passive set containing any sensor(s) of the candidate set not to participate in the cooperative spectrum sensing by applying an optimization procedure which performs a constrained optimization of the cost in accordance with the defined cost formula.

17. An element for sensor selection relating to cooperative spectrum sensing, the element characterised by being configured to perform the steps of:
obtaining a candidate set of sensors that can participate in the cooperative spectrum sensing and estimates of positions of the sensors in the candidate set;
selecting a first sensor from the candidate set and including the first sensor in an active set of sensors which are to participate in the cooperative spectrum sensing;
selecting a next sensor from the candidate set which has not previously been selected;
adding the selected next sensor either to the active set or to a passive set, the selected next sensor being added to the active set if and only if a distance from the selected next sensor to each sensor already in the active set is greater than a threshold value, the threshold value being greater than or equal to a predetermined decorrelation distance; and
repeating, if necessary, the steps of selecting a next sensor and adding until a number of sensors in the active set has reached a predetermined target level or until all sensors in the candidate set have been added in the active or passive set.

* * * * *